US010062341B2

(12) United States Patent
He et al.

(10) Patent No.: US 10,062,341 B2
(45) Date of Patent: Aug. 28, 2018

(54) DRIVING METHOD AND DRIVING APPARATUS, DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Zongze He, Beijing (CN); Weihao Hu, Beijing (CN); Jieqiong Wang, Beijing (CN); Zhiming Meng, Beijing (CN); Wengang Su, Beijing (CN); Yangbing Yu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 43 days.

(21) Appl. No.: 15/126,830

(22) PCT Filed: Oct. 13, 2015

(86) PCT No.: PCT/CN2015/091826

§ 371 (c)(1),
(2) Date: Sep. 16, 2016

(87) PCT Pub. No.: WO2016/184016

PCT Pub. Date: Nov. 24, 2016

(65) Prior Publication Data

US 2017/0092208 A1 Mar. 30, 2017

(30) Foreign Application Priority Data

May 21, 2015 (CN) .......................... 2015 1 0263880

(51) Int. Cl.
*G09G 5/10* (2006.01)
*G09G 5/02* (2006.01)
(Continued)

(52) U.S. Cl.
CPC ......... *G09G 3/3607* (2013.01); *G09G 3/3648* (2013.01); *G09G 2320/0204* (2013.01)

(58) Field of Classification Search
CPC ......... G06F 17/30047; G06F 17/30041; G06F 3/011
See application file for complete search history.

(56) References Cited

U.S. PATENT DOCUMENTS

2008/0013126 A1 1/2008 Tseng et al.
2008/0174591 A1 7/2008 Park et al.
(Continued)

FOREIGN PATENT DOCUMENTS

CN 101165763 A 4/2008
CN 101197119 A 6/2008
(Continued)

OTHER PUBLICATIONS

Office Action in Chinese Application No. 201510263880.6 dated Sep. 28, 2016, with English translation. 9 pages.
(Continued)

*Primary Examiner* — Nan-Ying Yang
(74) *Attorney, Agent, or Firm* — Womble Bond Dickinson (US) LLP

(57) ABSTRACT

A driving method, a driving apparatus and a display device are disclosed. The driving method comprises: forming a first partition overdriving table and a second partition overdriving table. The first partition overdriving table corresponds to the first partition, and the second partition overdriving table corresponds to the second partition. The first partition overdriving table and the second partition overdriving table have the same matrix form. Smooth treatment is performed on a first partition and a second partition which are adjacent to each other according to the first smooth algorithm so as to blur the boundary between the first partition and the second partition, thereby effectively reducing or eliminating the phenomenon of demarcation between multiple partitions.

15 Claims, 4 Drawing Sheets

(51) Int. Cl.

| | |
|---|---|
| ***G06F 3/038*** | (2013.01) |
| ***G09G 5/00*** | (2006.01) |
| ***G09G 3/36*** | (2006.01) |

(56) References Cited

U.S. PATENT DOCUMENTS

2011/0279466 A1* 11/2011 Park ..................... G09G 3/3648
345/581
2016/0247427 A1* 8/2016 Fan .......................... G09G 3/36

FOREIGN PATENT DOCUMENTS

| | | | |
|---|---|---|---|
| CN | 101547366 | A | 9/2009 |
| CN | 102243848 | A | 11/2011 |
| CN | 103187039 | A | 7/2013 |
| CN | 103366692 | A | 10/2013 |
| CN | 104361872 | A | 2/2015 |
| CN | 104835467 | A | 8/2015 |
| EP | 1564712 | A1 | 8/2005 |
| JP | 2010217892 | A | 9/2010 |

OTHER PUBLICATIONS

International Search Report and Written Opinion in PCT/CN2015/091826 dated Feb. 1, 2016, with English translation. 16 pages.

* cited by examiner

DRIVING METHOD AND DRIVING APPARATUS, DISPLAY DEVICE

RELATED APPLICATIONS

The present application is the U.S. national phase entry of PCT/CN2015/091826, with an international filing date of Oct. 13, 2015, which claims the benefit of Chinese Patent Application No. 201510263880.6, filed on May 21, 2015, the entire disclosures of which are incorporated herein by reference.

FIELD

The present disclosure relates to the field of display technologies, and particularly to a driving method, a driving apparatus, and a display device.

BACKGROUND

In the existing display field, as the size of the display panel increases, the temperatures on the surface of the display panel would be distributed non-uniformly. However, the response time of liquid crystal is related to the temperature. Upon 3D display, since the temperatures on the surface of a large-sized display panel are distributed non-uniformly, it is required to perform local overdriving compensation. The local overdriving compensation can well solve the crosstalk problem in 3D display resulting from the non-uniform distribution of temperatures on the surface of the display panel. However, when the overdriving compensation values between two partitions are greatly different, it would lead to a display problem of demarcation between partitions.

SUMMARY

The present disclosure provides a driving method, a driving apparatus, and a display device, which at least partially alleviates or eliminates the problem in the prior art, and is specifically used for solving the technical problem of demarcated display between overdriving partitions resulting from great difference between the overdriving compensation values of overdriving partitions in the prior art.

To this end, a first aspect of the present disclosure provides a driving method, which may comprise:

partitioning a display area into a plurality of rectangular partitions, a first transitional region formed between a first partition and a second partition which are adjacent to each other;

forming a first partition overdriving table and a second partition overdriving table, the first partition overdriving table corresponding to the first partition, the second partition overdriving table corresponding to the second partition, the first partition overdriving table and the second partition overdriving table having the same matrix form;

performing operational processing on the first partition overdriving table and the second partition overdriving table according to a first smooth algorithm to form a first smooth overdriving table, the first smooth overdriving table corresponding to the first transitional region;

driving the first transitional region according to the first smooth overdriving table.

In accordance with an embodiment, a first grayscale value of the first partition overdriving table may be A, and a second grayscale value of the second partition overdriving table may be B. The position of the first grayscale value in the matrix form is corresponding to that of the second grayscale value therein, and A and B are natural numbers.

Said performing operational processing on the first partition overdriving table and the second partition overdriving table according to a first smooth algorithm to form a first smooth overdriving table comprises:

defining a direction from the first partition to the second partition as a first direction;

calculating the number of pixel units of the first transitional region in the first direction as n, wherein n is a natural number;

starting from the first grayscale value A, a calculation formula of a grayscale value of an m-th pixel unit located within the first transitional region along the first direction being $$A + \frac{B - A}{n + 1} * m,$$

wherein n is the number of pixel units, m is a natural number, to form the first smooth overdriving table.

In accordance with another embodiment, the rectangular partitions may further include a third partition and a fourth partition. The first partition is arranged adjacent to the second partition and the fourth partition, respectively, and the third partition is arranged adjacent to the second partition and the fourth partition, respectively. First transitional regions being formed between adjacent first partition and second partition, between adjacent second partition and third partition, between adjacent third partition and fourth partition, and between adjacent fourth partition and first partition. The first partition, the second partition, the third partition and the fourth partition together define a second transitional region.

A third partition overdriving table and a fourth partition overdriving table are formed simultaneously with said forming the first partition overdriving table and the second partition overdriving table. The third partition overdriving table corresponds to the third partition and the fourth partition overdriving table corresponds to the fourth partition. The first partition overdriving table, the second partition overdriving table, the third partition overdriving table and the fourth partition overdriving table have the same matrix form.

At the same time as said performing operational processing on the first partition overdriving table and the second partition overdriving table according to a first smooth algorithm to form a first smooth overdriving table, operational processing is performed on the first partition overdriving table, the second partition overdriving table, the third partition overdriving table and the fourth partition overdriving table according to a second smooth algorithm to form a second smooth overdriving table. The second smooth overdriving table corresponds to the second transitional region.

The second transitional region is driven according to the second smooth overdriving table simultaneously with said driving the first transitional region according to the first smooth overdriving table.

In accordance with a further embodiment, a third grayscale value of the third partition overdriving table may be C and a fourth grayscale value of the fourth partition overdriving table may be D. The positions of the first grayscale value, the second grayscale value, the third grayscale value and the fourth grayscale value in the matrix form are corresponding to one another, and C and D are natural numbers.

Said performing operational processing on the first partition overdriving table, the second partition overdriving table, the third partition overdriving table and the fourth partition overdriving table according to a second smooth algorithm to form a second smooth overdriving table comprises:

calculating a grayscale value of pixel units of the second transitional region as $$\frac{A+B+C+D}{4},$$

to form the second smooth overdriving table.

A second aspect of the present disclosure provides a driving apparatus comprising a partitioning unit, a first forming unit, a second forming unit and a driving unit.

The partitioning unit is used for partitioning a display area into a plurality of rectangular partitions, and a first transitional region is formed between a first partition and a second partition which are adjacent to each other.

The first forming unit is used for forming a first partition overdriving table and a second partition overdriving table. The first partition overdriving table corresponds to the first partition, the second partition overdriving table corresponds to the second partition, and the first partition overdriving table and the second partition overdriving table have the same matrix form.

The second forming unit is used for performing operational processing on the first partition overdriving table and the second partition overdriving table according to a first smooth algorithm to form a first smooth overdriving table, the first smooth overdriving table corresponding to the first transitional region.

The driving unit is used for driving the first transitional region according to the first smooth overdriving table.

In accordance with an embodiment, a first grayscale value of the first partition overdriving table may be A and a second grayscale value of the second partition overdriving table may be B. The position of the first grayscale value in the matrix form is corresponding to that of the second grayscale value therein, and A and B are natural numbers. Moreover, the second forming unit comprises a definition module, a first calculation module and an accumulation module.

The definition module is used for defining a direction from the first partition to the second partition as a first direction.

The first calculation module is used for calculating the number of pixel units of the first transitional region in the first direction as n, wherein n is a natural number.

The accumulation module is used for, starting from the first grayscale value A, calculating a grayscale value of an m-th pixel unit located within the first transitional region along the first direction as $$A+\frac{B-A}{n+1}*m,$$

wherein n is the number of pixel units, m is a natural number, to form the first smooth overdriving table.

In accordance with another embodiment, the rectangular partitions further include a third partition and a fourth partition. The first partition is arranged adjacent to the second partition and the fourth partition, respectively, and the third partition is arranged adjacent to the second partition and the fourth partition, respectively. The first partition, the second partition, the third partition and the fourth partition together define a second transitional region.

The first forming unit is further used for forming a third partition overdriving table and a fourth partition overdriving table. The third partition overdriving table corresponds to the third partition, the fourth partition overdriving table corresponds to the fourth partition, and the first partition overdriving table, the second partition overdriving table, the third partition overdriving table and the fourth partition overdriving table have the same matrix form.

The second forming unit is further used for performing operational processing on the first partition overdriving table, the second partition overdriving table, the third partition overdriving table and the fourth partition overdriving table according to a second smooth algorithm to form a second smooth overdriving table, the second smooth overdriving table corresponding to the second transitional region.

The driving unit is further used for driving the second transitional region according to the second smooth overdriving table.

In accordance with a further embodiment, a third grayscale value of the third partition overdriving table may be C and a fourth grayscale value of the fourth partition overdriving table may be D. The positions of the first grayscale value, the second grayscale value, the third grayscale value and the fourth grayscale value in the matrix form are corresponding to one another, and C and D are natural numbers. The second forming unit further comprises a second calculation module.

The second calculation module is used for calculating a grayscale value of pixel units of the second transitional region as $$\frac{A+B+C+D}{4},$$

to form the second smooth overdriving table.

In accordance with yet another embodiment, the partitioning unit comprises a counter and a register. The counter is used for counting corresponding data lines and gate lines thereby forming coordinate values of the pixel units, and the register is used for storing the coordinate values.

In accordance with an additional embodiment, the first forming unit may comprise a first accumulator and a first memory. The first accumulator is used for manually debugging all combinations of grayscale values of the current frame and grayscale values of the previous frame, and storing desired overdriving grayscale values in the first memory.

In accordance with embodiments, the second forming unit may comprise a second accumulator and a second memory. The second accumulator is used for performing accumulation with $$\frac{B-A}{n+1}$$

from an initial overdriving grayscale value successively, thereby obtaining corresponding overdriving grayscale values, and storing the overdriving grayscale values in the second memory.

In accordance with an additional embodiment, the driving unit comprises a source driver.

The present disclosure further provides a display device comprising any driving apparatus described above.

In the driving method, the driving apparatus, and the display device provided by the present disclosure, smooth treatment is performed on a first partition and a second partition which are adjacent to each other according to the first smooth algorithm so as to blur the boundary between the first partition and the second partition, thereby effectively reducing or eliminating the phenomenon of demarcation between multiple partitions.

DETAILED DESCRIPTION

To enable those skilled in the art to better understand the technical solution of the present disclosure, the driving method, the driving apparatus, and the display device provided by the present disclosure are described in detail below with reference to the drawings.

Figure 1:
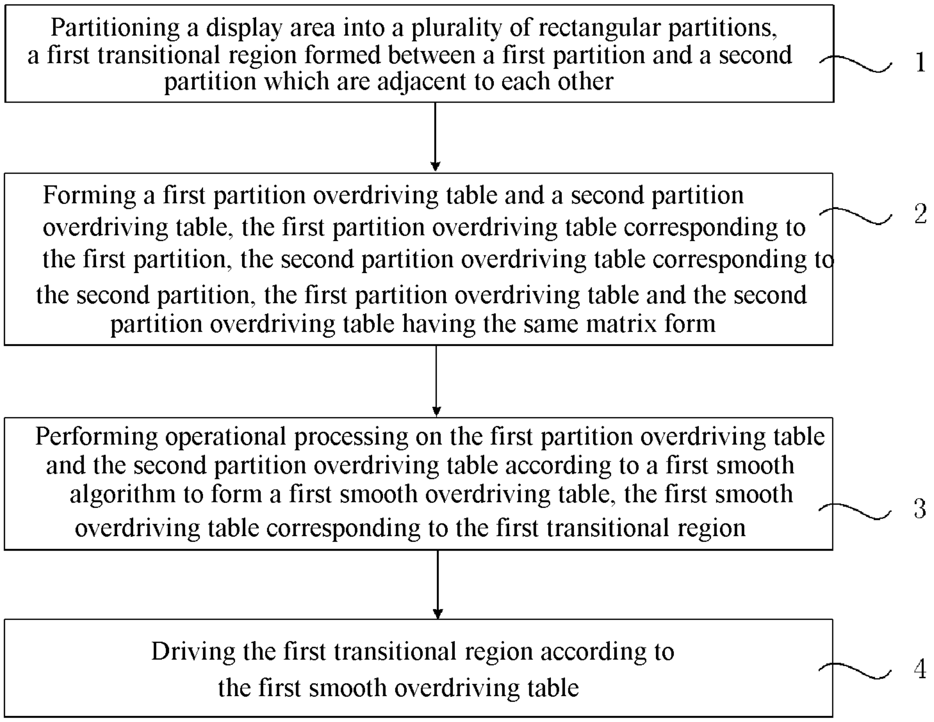
FIG. 1 is a flow chart of a driving method provided by an embodiment of the present disclosure.

FIG. 1 is a flow chart of a driving method provided by an embodiment of the present disclosure. As shown in FIG. 1, the driving method comprises partitioning a display area into a plurality of rectangular partitions, and forming a first transitional region between a first partition and a second partition which are adjacent to each other.

Figure 2:
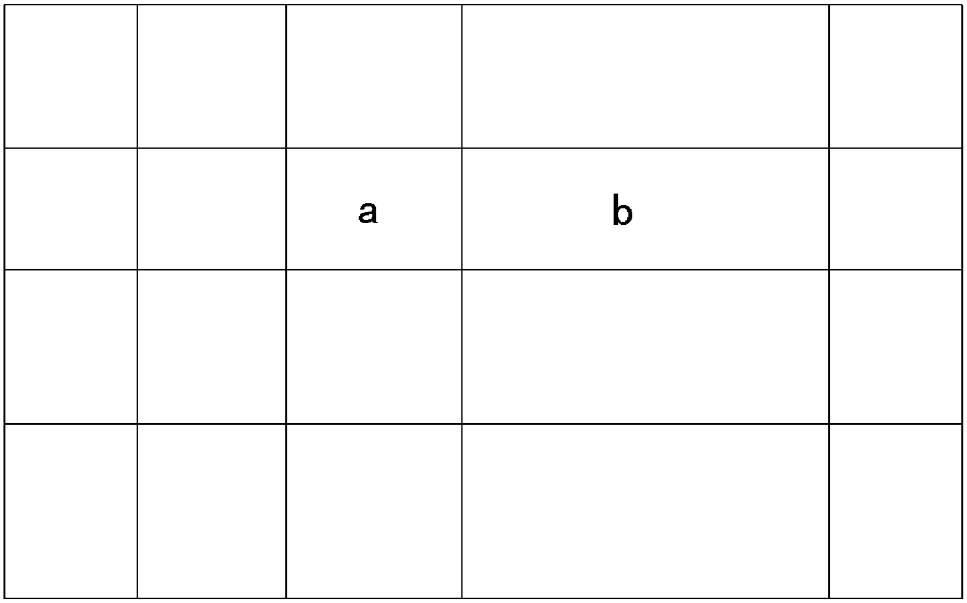
FIG. 2 is a schematic view of forming overdriving partitions in the embodiment illustrated in FIG. 1.
Figure 3:
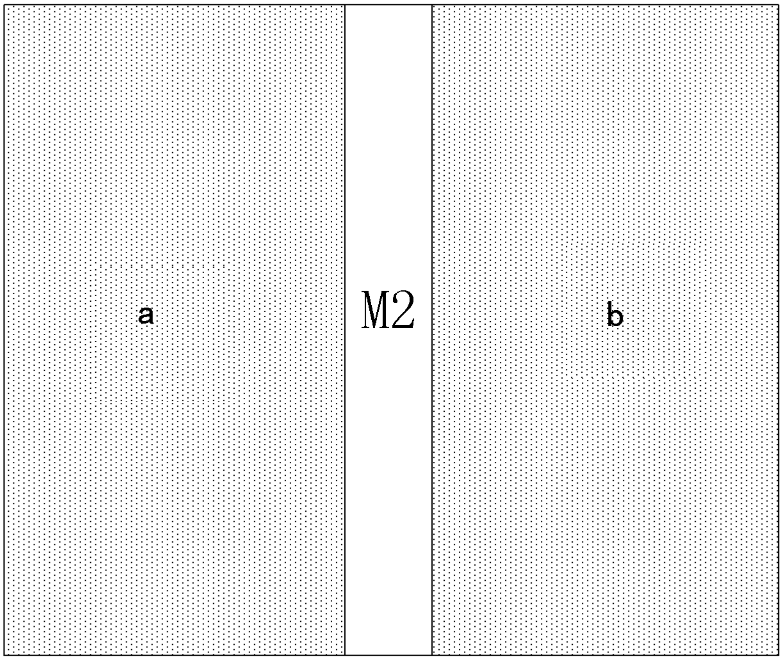
FIG. 3 is a schematic view of forming transitional regions in the embodiment illustrated in FIG. 1.

FIG. 2 is a schematic view of forming overdriving partitions in the embodiment illustrated in FIG. 1. FIG. 3 is a schematic view of forming transitional regions in the embodiment illustrated in FIG. 1. As shown in FIGS. 2 and 3, the display area is partitioned into a plurality of overdriving partitions based on the temperature distribution on the surface of the display panel, wherein a first transitional region M2 is formed between adjacent first partition a and second partition b. It is to be noted that although this embodiment only describes the situation that concerns two overdriving partitions, the present disclosure also intends to encompass other numbers of overdriving partitions, e.g. four overdriving partitions, six overdriving partitions or eight overdriving partitions.

Each overdriving partition corresponds to an overdriving table. The display panel performs overdrive processing on a corresponding overdriving partition according to the overdriving table. The so-called "overdriving" is to apply a voltage higher than the voltage of the target state to the liquid crystal molecules when a corresponding voltage of the target state of the liquid crystal molecules is higher than the current voltage of the liquid crystal molecules, and to apply a voltage lower than the voltage of the target state to the liquid crystal molecules when a corresponding voltage of the target state of the liquid crystal molecules is lower than the current voltage of the liquid crystal molecules. The applied voltage which is higher or lower than the voltage of the target state is called an overdrive voltage.

The driving method further comprises forming a first partition overdriving table and a second partition overdriving table. The first partition overdriving table corresponds to the first partition and the second partition overdriving table corresponds to the second partition. The first partition overdriving table and the second partition overdriving table have the same matrix form.

In this embodiment, the first partition overdriving table corresponds to the first partition a and the second partition overdriving table corresponds to the second partition b. The first partition overdriving table and the second partition overdriving table have the same matrix form.

In practical applications, overdriving enables accelerated rotation of liquid crystal molecules, thereby shortening the grayscale response time of the liquid crystal modules. As regards the specific value of an overdrive voltage to be applied, it can be obtained from a corresponding overdriving table. Specifically, an overdriving grayscale value is obtained by querying the overdriving table according to the grayscale value of the previous frame and the grayscale value of the current frame. The overdriving grayscale value corresponds to the overdrive voltage. Table 1 shows overdriving grayscale values of the first partition overdriving table. Table is shown as follows.

TABLE 1

| | | | | | | | | | | | | | | | | | | |
|---|---|---|---|---|---|---|---|---|---|---|---|---|---|---|---|---|---|---|
| Current frame | 256 | 255 | 255 | 255 | 255 | 255 | 255 | 255 | 255 | 255 | 255 | 255 | 255 | 255 | 255 | 255 | 255 | 255 |
| | 240 | 251 | 251 | 251 | 251 | 251 | 251 | 250 | 250 | 249 | 248 | 247 | 246 | 245 | 244 | 242 | 240 | 237 |
| | 224 | 240 | 240 | 240 | 240 | 240 | 239 | 238 | 236 | 235 | 233 | 232 | 230 | 228 | 226 | 224 | 221 | 217 |
| | 208 | 225 | 225 | 225 | 225 | 225 | 224 | 222 | 221 | 219 | 217 | 215 | 213 | 211 | 208 | 205 | 201 | 195 |
| | 192 | 212 | 212 | 212 | 212 | 211 | 210 | 208 | 206 | 203 | 201 | 198 | 195 | 192 | 188 | 184 | 179 | 171 |
| | 176 | 199 | 199 | 199 | 199 | 197 | 194 | 192 | 189 | 187 | 183 | 179 | 176 | 172 | 167 | 161 | 155 | 146 |
| | 160 | 185 | 185 | 185 | 184 | 181 | 178 | 175 | 172 | 168 | 164 | 160 | 156 | 151 | 146 | 139 | 132 | 123 |
| | 144 | 168 | 168 | 168 | 167 | 163 | 160 | 156 | 152 | 148 | 144 | 140 | 135 | 130 | 124 | 116 | 107 | 96 |
| | 128 | 149 | 149 | 150 | 147 | 143 | 140 | 136 | 132 | 128 | 123 | 117 | 111 | 105 | 98 | 89 | 78 | 67 |
| | 112 | 133 | 133 | 133 | 130 | 126 | 122 | 117 | 112 | 107 | 101 | 95 | 89 | 81 | 74 | 64 | 54 | 45 |
| | 96 | 116 | 116 | 114 | 110 | 105 | 101 | 96 | 91 | 86 | 79 | 73 | 65 | 59 | 53 | 43 | 33 | 21 |
| | 80 | 96 | 96 | 94 | 90 | 85 | 80 | 75 | 69 | 63 | 57 | 52 | 46 | 39 | 32 | 21 | 6 | 0 |
| | 64 | 77 | 77 | 74 | 69 | 64 | 60 | 56 | 51 | 46 | 40 | 33 | 25 | 18 | 7 | 0 | 0 | 0 |
| | 48 | 55 | 55 | 52 | 48 | 44 | 39 | 34 | 28 | 22 | 14 | 5 | 0 | 0 | 0 | 0 | 0 | 0 |
| | 32 | 37 | 35 | 32 | 28 | 22 | 17 | 11 | 2 | 0 | 0 | 0 | 0 | 0 | 0 | 0 | 0 | 0 |
| | 16 | 19 | 16 | 12 | 6 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 | 0 | |
| A | | 0 | 16 | 32 | 48 | 64 | 80 | 96 | 112 | 128 | 144 | 160 | 176 | 192 | 208 | 224 | 240 | 256 |
| | | | | | | | | | | Previous frame | | | | | | | | |

The matrix form of the first partition overdriving table shown in Table 1 is 17*17. Since the first partition overdriving table and the second partition overdriving table have the same the matrix form, the matrix form of the second overdriving table is also 17*17.

The driving method further comprises performing operational processing on the first partition overdriving table and the second partition overdriving table according to a first smooth algorithm to form a first smooth overdriving table. The first smooth overdriving table corresponds to the first transitional region.

In this embodiment, the theory of the first smooth algorithm is: first obtaining an amount to be accumulated, then accumulating the grayscale values successively along a specific direction, thereby obtaining corresponding grayscale values in the first smooth overdriving table so as to achieve smooth transition of the transitional region.

In this embodiment, the first grayscale value of the first partition overdriving table is A and the second grayscale value of the second partition overdriving table is B, wherein A and B are natural numbers, and the position of the first grayscale value in the matrix form is corresponding to that of the second grayscale value therein. Such position correspondence is described below in detail. For example, the first partition overdriving table is Table 1, since the first partition overdriving table and the second partition overdriving table have the same matrix form, the matrix form of the second partition overdriving table is also 17*17. Referring to Table 1, one of the grayscale values A is randomly taken: grayscale value 126 to which the previous frame 64 of row number 5 and the current frame 112 of column number 8 correspond. Accordingly, the grayscale value B is a grayscale value to which row number 5 and column number 8 in the second partition overdriving table correspond. In this manner, the position of the first grayscale value and that of the second grayscale value in the matrix form are corresponding to each other.

Figure 4:
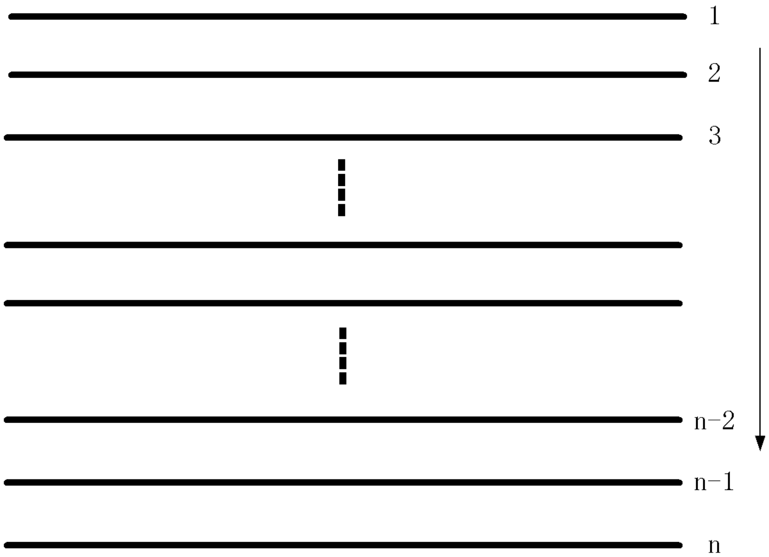
FIG. 4 is a schematic view of performing smooth treatment on the transitional regions in the embodiment illustrated in FIG. 1.

The process of forming the first smooth overdriving table is specifically descried below based on the example of the first transitional region M2. FIG. 4 is a schematic view of performing smooth treatment on the transitional region in the embodiment shown in FIG. 1. As shown in FIG. 4, the direction from the first partition a to the second partition b is defined as a first direction which is the direction of arrow. The number of pixel units of the first transitional region M2 in the first direction is calculated as n, wherein n is a natural number.

Starting from the first grayscale value A, the grayscale values of the pixel units along the first direction are accumulated with $$\frac{B-A}{n+1}$$

successively to form the first smooth overdriving table. Specifically, the grayscale value of the pixel unit located at the first position is $$A+\frac{B-A}{n+1},$$

the grayscale value of the pixel unit located at the second position is $$A+\frac{B-A}{n+1}*2,$$

the grayscale value of the pixel unit located at the third position is $$A+\frac{B-A}{n+1}*3, \dots ,$$

the grayscale value of the pixel unit located at the (n−2)-th position is $$A+\frac{B-A}{n+1}*(n\text{-}2),$$

the grayscale value of the pixel unit located at the (n−1)-th position is $$A+\frac{B-A}{n+1}*(n\text{-}1),$$

and the grayscale value of the pixel unit located at the n-th position is $$A+\left(\frac{B-A}{n+1}\right)*n.$$

In this way, the first smooth overdriving table can be formed after each corresponding grayscale value is obtained.

The driving method further comprises driving the first transitional region according to the first smooth overdriving table.

In the driving method provided by this embodiment, smooth treatment is performed on a first partition and a second partition which are adjacent to each other according to the first smooth algorithm so as to blur the boundary between the first partition and the second partition, thereby effectively reducing or eliminating the phenomenon of demarcation between multiple partitions.

Figure 5:
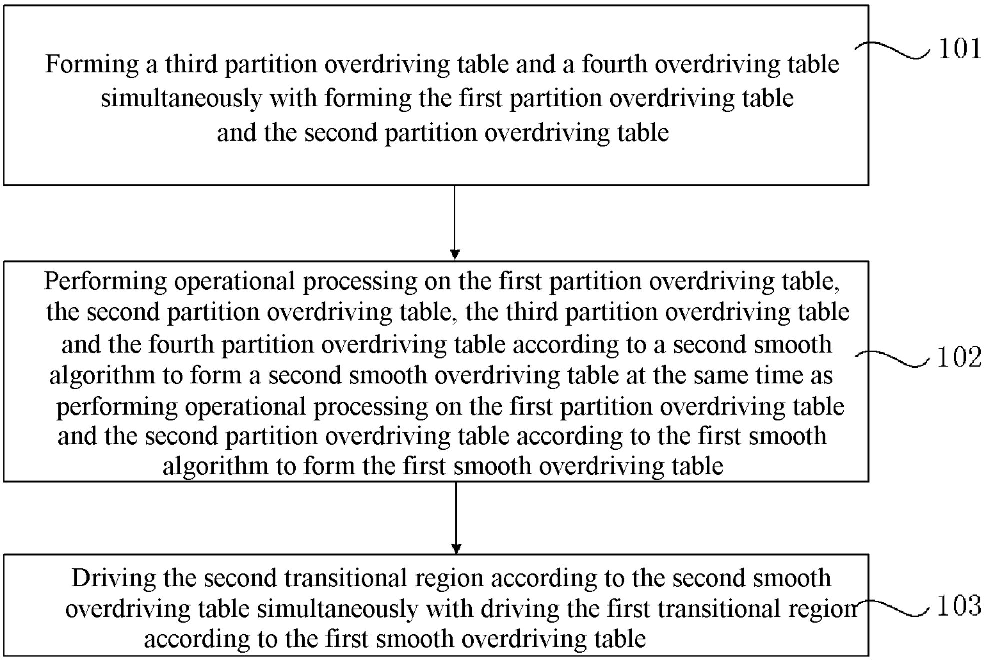
FIG. 5 is a flow chart of a driving method provided by another embodiment of the present disclosure.
Figure 6:
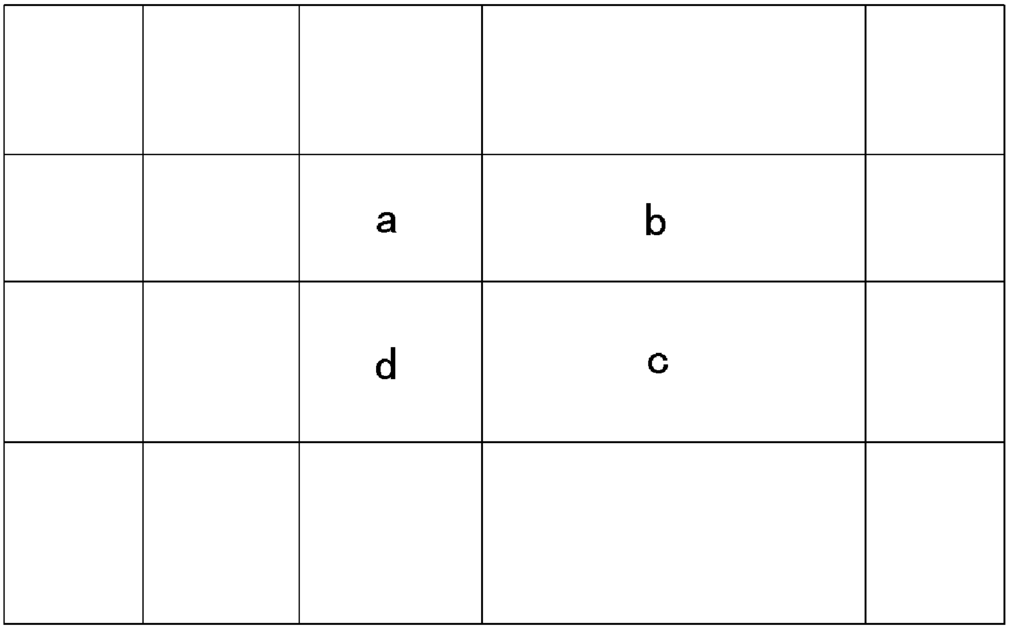
FIG. 6 is a schematic view of forming overdriving partitions in the embodiment illustrated in FIG. 5.
Figure 7:
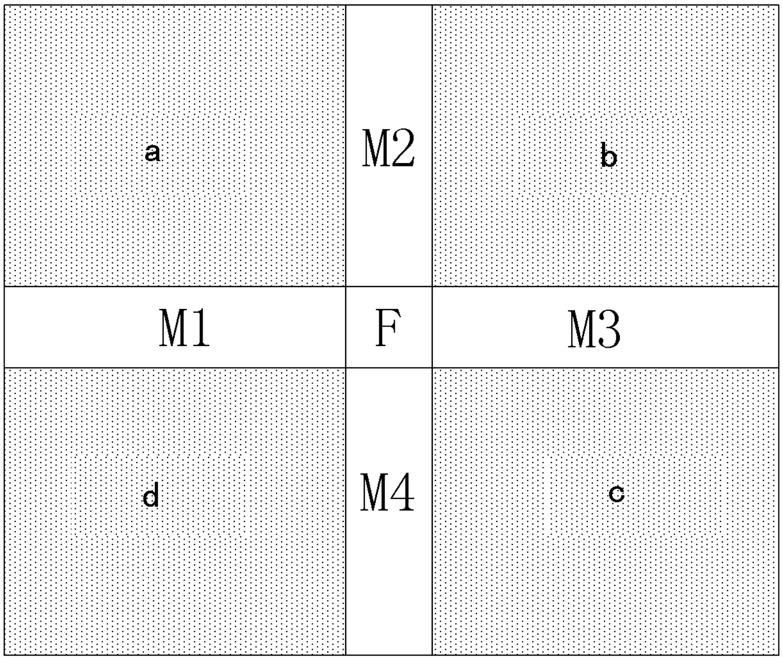
FIG. 7 is a schematic view of forming transitional regions in the embodiment illustrated in FIG. 5.

FIG. 5 is a flow chart of a driving method provided by another embodiment of the present disclosure. FIG. 6 is a schematic view of forming overdriving partitions in the embodiment illustrated in FIG. 5. FIG. 7 is a schematic view of forming transitional regions in the embodiment illustrated in FIG. 5. Referring to FIGS. 5-7, the display area is partitioned into a plurality of overdriving partitions according to the distribution of temperatures on the surface of the display panel. The overdriving partitions include a first partition a, a second partition b, a third partition c and a fourth partition d. A first transitional region is formed between adjacent first partition a and second partition b, between adjacent second partition b and third partition c, between adjacent third partition c and fourth partition d, and between adjacent fourth partition d and first partition a. The first partition, the second partition, the third partition and the fourth partition together define a second transitional region. Specifically, the first partition a is arranged adjacent to the second partition b and the fourth partition d, respectively, and the third partition c is arranged adjacent to the second partition b and the fourth partition d, respectively. A first transitional region M1 is formed between adjacent first partition a and fourth partition d, a first transitional region M2 is formed between adjacent first partition a and second partition b, a first transitional region M3 is formed between adjacent second partition b and third partition c, and a first transitional region M4 is formed between adjacent third partition c and fourth partition d. The first partition a, the second partition b, the third partition c and the fourth partition d together define a second transitional region F. It is to be noted that specific contents about forming a first smooth overdriving table to which the first transitional region corresponds may refer to the description of the above embodiment, which are not discussed here for simplicity. This embodiment specifically describes the process of forming a second smooth overdriving table based on the example of the second transitional region F.

The driving method comprises, at step 101, forming a third partition overdriving table and a fourth overdriving table simultaneously with forming the first partition overdriving table and the second partition overdriving table.

In this embodiment, the first partition overdriving table corresponds to the first partition a, the second partition overdriving table corresponds to the second partition b, the third partition overdriving table corresponds to the third partition c, and the fourth partition overdriving table corresponds to the fourth partition d. The first partition overdriving table, the second partition overdriving table, the third partition overdriving table, and the fourth partition overdriving table have the same matrix form.

In practical applications, overdriving enables accelerated rotation of liquid crystal molecules, thereby shortening the grayscale response time of the liquid crystal modules. As regards the specific value of an overdrive voltage to be applied, it can be obtained from a corresponding overdriving table. Specifically, an overdriving grayscale value is obtained by querying the overdriving table according to the grayscale value of the previous frame and the grayscale value of the current frame. The overdriving grayscale value corresponds to the overdrive voltage.

Referring to Table 1, the matrix form of the first partition overdriving table shown in Table 1 is 17*17. Since the first partition overdriving table, the second partition overdriving table, the third partition overdriving table and the fourth partition overdriving table have the same matrix form, the matrix forms of the second overdriving table, the third partition overdriving table and the fourth partition overdriving table are also 17*17.

The driving method further comprises, at step 102, performing operational processing on the first partition overdriving table, the second partition overdriving table, the third partition overdriving table and the fourth partition overdriving table according to a second smooth algorithm to form a second smooth overdriving table at the same time as performing operational processing on the first partition overdriving table and the second partition overdriving table according to the first smooth algorithm to form the first smooth overdriving table.

In this embodiment, the second smooth overdriving table corresponds to the second transitional region. The theory of the second smooth algorithm is: averaging corresponding grayscale values in the first partition overdriving table, the second partition overdriving table, the third partition overdriving table and the fourth partition overdriving table, thereby obtaining grayscale values in the second smooth overdriving table, so as to achieve smooth transition of the transitional region.

Referring to FIG. 3, the first grayscale value of the first partition overdriving table is A, the second grayscale value of the second partition overdriving table is B, the third grayscale value of the third partition overdriving table is C, and the fourth grayscale value of the fourth partition overdriving table is D, wherein A, B, C and D are natural numbers. The positions of the first grayscale value, the second grayscale value, the third grayscale value and the fourth grayscale value in the matrix form correspond to one another. Such "position correspondence" is described below in detail. For example, the first partition overdriving table is Table 1. Since the first partition overdriving table, the second partition overdriving table, the third partition overdriving table and the fourth partition overdriving table have the same matrix form, the matrix forms of the second partition overdriving table, the third partition overdriving table and the fourth partition overdriving table are also 17*17. Referring to Table 1, any one of the grayscale values A is taken: grayscale value 126 to which the previous frame 64 of row number 5 and the current frame 112 of column number 8 correspond. Accordingly, the grayscale value B is a grayscale value to which row number 5 and column number 8 in the second partition overdriving table correspond, the grayscale value C is a grayscale value to which row number 5 and column number 8 in the third partition overdriving table correspond, and the grayscale value D is a grayscale value to which row number 5 and column number 8 in the fourth partition overdriving table correspond. In this manner, the positions of the first grayscale value, the second grayscale value, the third grayscale value and the fourth grayscale value in the matrix form are corresponding to one another.

Said performing operational processing on the first partition overdriving table, the second partition overdriving table, the third partition overdriving table and the fourth partition overdriving table according to a second smooth algorithm to form a second smooth overdriving table comprises calculating the grayscale value of the pixel units of the second transitional region as $$\frac{A+B+C+D}{4},$$

to form the second smooth overdriving table.

The driving method further comprises, at step 103, driving the second transitional region according to the second smooth overdriving table simultaneously with driving the first transitional region according to the first smooth overdriving table.

In this embodiment, the second transitional region F corresponds to the second smooth overdriving table. The display panel performs overdrive processing on the second transitional region F according to the second smooth overdriving table. Specifically, the second smooth overdriving table is queried according to the grayscale value of the previous frame and the grayscale value of the current frame thereby obtaining an overdriving grayscale value. The overdriving grayscale value corresponds to the overdriving voltage. The display panel drives the second transitional region F according to the overdriving voltage.

In the driving method provided by this embodiment, smooth treatment is performed on respective adjacent partitions according to the first smooth algorithm so as to blur the boundaries between respective partitions, thereby effectively reducing or eliminating the phenomenon of demarcation between multiple partitions.

The present disclosure further provides a driving apparatus comprising a partitioning unit, a first forming unit, a second forming unit and a driving unit. The partitioning unit is used for partitioning the display area into a plurality of rectangular partitions, and a first transitional region is formed between a first partition and a second partition which are adjacent to each other. In this embodiment, partitioning the display area is achieved by human eye observation based on manual debugging. The partitioning unit may comprise a counter and a register. The counter is used for counting corresponding data lines and gate lines to form coordinate values of the pixel units. The register is used for storing the coordinate values. Finally, the display area is partitioned into a plurality of rectangular partitions by means of manual debugging.

The first forming unit is used for forming the first partition overdriving table and the second partition overdriving table. The first partition overdriving table corresponds to the first partition and the second partition overdriving table corresponds to the second partition. The first partition overdriving table and the second partition overdriving table have the same matrix form. The first forming unit may comprise a first accumulator and a first memory. In this embodiment, the overdriving table is obtained by manual debugging based on experiments. The overdrive processing is to apply a larger grayscale value based on a relative difference between the grayscale value of the current frame and the grayscale value of the previous frame, thereby speeding up the response. This grayscale value is called an overdriving grayscale value. Actually, the overdriving grayscale value depends on a combination of the grayscale value of the previous frame and the grayscale value of the current frame, which is complicated and cannot be determined by a simple formula. It needs to be determined based on the practically measured values of respective combinations, finally obtaining an overdriving table. Therefore, to obtain a desired overdriving table, it is required to perform manual debugging of all combinations of the grayscale values of the current frame and the grayscale values of the previous frame by the first accumulator, and store desired overdriving grayscale values in the first memory, thereby forming an overdriving table in the first memory.

The second forming unit is used for performing operational processing on the first partition overdriving table and the second partition overdriving table according to the first smooth algorithm to form the first smooth overdriving table. The first smooth overdriving table corresponds to the first transitional region.

The second forming unit may comprise a second accumulator and a second memory. The second accumulator performs accumulation with $$\frac{B-A}{n+1}$$

from the initial overdriving grayscale value, thereby obtaining corresponding overdriving grayscale values. The overdriving grayscale values are stored in the second memory, thereby forming the first smooth overdriving table in the second memory. The detailed accumulation process is specifically described below, which is not discussed here for simplicity.

The driving unit is used for driving the first transitional region according to the first smooth overdriving table. In this embodiment, the driving unit comprises a source driver. The driving apparatus provided by this embodiment performs smooth treatment on a first partition and a second partition which are adjacent to each other according to the first smooth algorithm so as to blur the boundary between the first partition and the second partition, which can effectively reduce or eliminate the phenomenon of demarcation between the first partition and the second partition.

Referring FIGS. 6 and 7, the partitioning unit partitions the display area into a plurality of overdriving partitions according to the distribution of temperatures on the surface of the display panel, wherein the first partition a is arranged adjacent to the second partition b and the fourth partition d, respectively, and the third partition c is arranged adjacent to the second partition b and the fourth partition d, respectively. A first transitional region M1 is formed between adjacent first partition a and fourth partition d, a first transitional region M2 is formed between adjacent first partition a and second partition b, a first transitional region M3 is formed between adjacent second partition b and third partition c, and a first transitional region M4 is formed between adjacent third partition c and fourth partition d. The first partition a, the second partition b, the third partition c and the fourth partition d together define a second transitional region F.

In this embodiment, the first forming unit forms the first partition overdriving table, the second partition overdriving table, the third partition overdriving table and the fourth partition overdriving table. The first partition overdriving table corresponds to the first partition a, the second partition overdriving table corresponds to the second partition b, the third partition overdriving table corresponds to the third partition c, and the fourth partition overdriving table corresponds to the fourth partition d. The first partition overdriving table, the second partition overdriving table, the third partition overdriving table, and the fourth partition overdriving table have the same matrix form.

In this embodiment, the second forming unit performs operational processing on the first partition overdriving table and the second partition overdriving table according to a first smooth algorithm to form a first smooth overdriving table. The first smooth overdriving table corresponds to the first transitional region. Certainly, the second forming unit further performs operational processing on the first partition overdriving table, the second partition overdriving table, the third partition overdriving table and the fourth partition overdriving table according to a second smooth algorithm to form a second smooth overdriving table. The second smooth overdriving table corresponds to the second transitional region.

In this embodiment, the first grayscale value of the first partition overdriving table is A, the second grayscale value of the second partition overdriving table is B, the third grayscale value of the third partition overdriving table is C, and the fourth grayscale value of the fourth partition overdriving table is D. The positions of the first grayscale value, the second grayscale value, the third grayscale value and the fourth grayscale value in the matrix form are corresponding to one another.

Alternatively, the second forming unit comprises a definition module, a first calculation module and an accumulation module. The process of forming the first smooth overdriving table is specifically descried below based on the example of the first transitional region M2. Referring to FIG. 4, the definition module defines the direction from the first partition a to the second partition b as a first direction. The first calculation module calculates the number of pixel units of the first transitional region M2 in the first direction as n, wherein n is a natural number.

The accumulation module accumulates, starting from the first grayscale value A, the grayscale values of the pixel units along the first direction with $$\frac{B-A}{n+1}$$

successively to form the first smooth overdriving table. Specifically, the grayscale value of the pixel unit located at the first position is $$A+\frac{B-A}{n+1},$$

the grayscale value of the pixel unit located at the second position is $$A+\frac{B-A}{n+1}*2,$$

the grayscale value of the pixel unit located at the third position is $$A+\frac{B-A}{n+1}*3,\ \ldots\ ,$$

the grayscale value of the pixel unit located at the (n−2)-th position is $$A+\frac{B-A}{n+1}*(n\text{-}2),$$

the grayscale value of the pixel unit located at the (n−1)-th position is $$A+\frac{B-A}{n+1}*(n\text{-}1),$$

and the grayscale value of the pixel unit located at the n-th position is $$A+\frac{B-A}{n+1}*n.$$

In this way, the first smooth overdriving table can be formed after each corresponding grayscale value is obtained.

Alternatively, the second forming unit further comprises a second calculation module. The process of forming the second smooth overdriving table is specifically described below based on the example of the second transitional region F.

The second calculation module calculates the grayscale value of the pixel units of the second transitional region as $$\frac{A+B+C+D}{4},$$

to form the second smooth overdriving table.

In this embodiment, the driving unit drives the first transitional region according to the first smooth overdriving table. Meanwhile, the driving unit drives the second transitional region according to the second smooth overdriving table.

The driving apparatus provided by this embodiment performs smooth treatment on a first partition and a second partition which are adjacent to each other according to the first smooth algorithm so as to blur the boundary between the first partition and the second partition, which can effectively reduce or eliminate the phenomenon of demarcation between multiple partitions.

The present disclosure further provides a display device comprising the driving apparatus provided by the above embodiments. Specific contents may refer to the description of the above embodiments, which are not described here for simplicity.

The display device provided by this embodiment performs smooth treatment on a first partition and a second partition which are adjacent to each other according to the first smooth algorithm so as to blur the boundary between the first partition and the second partition, which can effectively reduce or eliminate the phenomenon of demarcation between multiple partitions.

It can be understood that the above embodiments are exemplary embodiments used only for illustrating the principle of the present disclosure, and that the present disclosure is not so limited. Various variations and improvements may be made by those ordinarily skilled in the art without departing from the spirit and essence of the present disclosure. These variations and improvements are regarded as falling within the scope of the present disclosure.

The invention claimed is:

1. A driving method, comprising:

partitioning a display area into a plurality of rectangular partitions, a first transitional region formed between a first partition and a second partition which are adjacent to each other;

forming a first partition overdriving table and a second partition overdriving table, the first partition overdriving table corresponding to the first partition, the second partition overdriving table corresponding to the second partition, the first partition overdriving table and the second partition overdriving table having the same matrix form;

performing operational processing on the first partition overdriving table and the second partition overdriving table according to a first smooth algorithm to form a first smooth overdriving table, the first smooth overdriving table corresponding to the first transitional region;

driving the first transitional region according to the first smooth overdriving table, wherein a first grayscale value of the first partition overdriving table is A, a second grayscale value of the second partition overdriving table is B, a position of the first grayscale value in the matrix form corresponding to that of the second grayscale value therein, A and B being natural numbers; and wherein said performing operational processing on the first partition overdriving table and the second partition overdriving table according to a first smooth algorithm to form a first smooth overdriving table comprises:

defining a direction from the first partition to the second partition as a first direction;

calculating the number of pixel units of the first transitional region in the first direction as n, wherein n is a natural number; and wherein said calculating includes starting from the first grayscale value A, a calculation formula of a grayscale value of an m-th pixel unit located within the first transitional region along the first direction being $$A+\frac{B-A}{n+1}*m,$$

is utilized, wherein n is the number of pixel units, m is a natural number, to form the first smooth overdriving table, wherein said starting from the first grayscale value A, calculating a grayscale value of an m-th pixel unit located within the first transitional region along the first direction as $$A+\frac{B-A}{n+1}*m,$$

to form the first smooth overdriving table, comprises:

performing, by an accumulator, accumulation with $$\frac{B-A}{n+1}$$

from an initial overdriving grayscale value successively, thereby obtaining corresponding overdriving grayscale values; and storing the overdriving grayscale values in a memory.

2. The driving method according to claim 1, wherein the rectangular partitions further include a third partition and a fourth partition, the first partition being arranged adjacent to the second partition and the fourth partition, respectively, the third partition being arranged adjacent to the second partition and the fourth partition, respectively, first transitional regions being formed between adjacent first partition and second partition, between adjacent second partition and third partition, between adjacent third partition and fourth partition, and between adjacent fourth partition and first partition, the first partition, the second partition, the third partition and the fourth partition together defining a second transitional region;

forming a third partition overdriving table and a fourth partition overdriving table simultaneously with said forming the first partition overdriving table and the second partition overdriving table, the third partition overdriving table corresponding to the third partition, the fourth partition overdriving table corresponding to the fourth partition, the first partition overdriving table, the second partition overdriving table, the third partition overdriving table and the fourth partition overdriving table having the same matrix form;

at the same time as said performing operational processing on the first partition overdriving table and the second partition overdriving table according to a first smooth algorithm to form a first smooth overdriving table, performing operational processing on the first partition overdriving table, the second partition overdriving table, the third partition overdriving table and the fourth partition overdriving table according to a second smooth algorithm to form a second smooth overdriving table, the second smooth overdriving table corresponding to the second transitional region;

driving the second transitional region according to the second smooth overdriving table simultaneously with said driving the first transitional region according to the first smooth overdriving table.

3. The driving method according to claim 2, wherein a third grayscale value of the third partition overdriving table is C, a fourth grayscale value of the fourth partition overdriving table is D, positions of the first grayscale value, the second grayscale value, the third grayscale value and the fourth grayscale value in the matrix form being corresponding to one another, C and D being natural numbers; and wherein said performing operational processing on the first partition overdriving table, the second partition overdriving table, the third partition overdriving table and the fourth partition overdriving table according to a second smooth algorithm to form a second smooth overdriving table comprises:

calculating a grayscale value of pixel units of the second transitional region as $$\frac{A+B+C+D}{4},$$

to form the second smooth overdriving table.

4. A driving apparatus comprising a partitioning unit, a first forming unit, a second forming unit and a driving unit;

the partitioning unit being used for partitioning a display area into a plurality of rectangular partitions, a first transitional region formed between a first partition and a second partition which are adjacent to each other;

the first forming unit being used for forming a first partition overdriving table and a second partition overdriving table, the first partition overdriving table corresponding to the first partition, the second partition overdriving table corresponding to the second partition, the first partition overdriving table and the second partition overdriving table having the same matrix form;

the second forming unit being used for performing operational processing on the first partition overdriving table and the second partition overdriving table according to a first smooth algorithm to form a first smooth overdriving table, the first smooth overdriving table corresponding to the first transitional region;

the driving unit being used for driving the first transitional region according to the first smooth overdriving table, wherein a first grayscale value of the first partition overdriving table is A, a second grayscale value of the second partition overdriving table is B, a position of the first grayscale value in the matrix form corresponding to that of the second grayscale value therein, A and B being natural numbers, the second forming unit comprising a definition module, a first calculation module and an accumulation module;

the definition module being used for defining a direction from the first partition to the second partition as a first direction;

the first calculation module being used for calculating the number of pixel units of the first transitional region in the first direction as n, wherein n is a natural number;

the accumulation module being used for, starting from the first grayscale value A, calculating a grayscale value of an m-th pixel unit located within the first transitional region along the first direction as $$A+\frac{B-A}{n+1}*m,$$

wherein n is the number of pixel units, m is a natural number, to form the first smooth overdriving table, wherein the second forming unit comprises a second accumulator and a second memory, the second accumulator being used for performing accumulation with $$\frac{B-A}{n+1}$$

from an initial overdriving grayscale value successively, thereby obtaining corresponding overdriving grayscale values, and storing the overdriving grayscale values in the second memory.

5. The driving apparatus according to claim 4, wherein the rectangular partitions further include a third partition and a fourth partition, the first partition being arranged adjacent to the second partition and the fourth partition, respectively, the third partition being arranged adjacent to the second partition and the fourth partition, respectively, the first partition, the second partition, the third partition and the fourth partition together defining a second transitional region;

the first forming unit being further used for forming a third partition overdriving table and a fourth partition overdriving table, the third partition overdriving table corresponding to the third partition, the fourth partition overdriving table corresponding to the fourth partition, the first partition overdriving table, the second partition overdriving table, the third partition overdriving table and the fourth partition overdriving table having the same matrix form;

the second forming unit being further used for performing operational processing on the first partition overdriving table, the second partition overdriving table, the third partition overdriving table and the fourth partition overdriving table according to a second smooth algorithm to form a second smooth overdriving table, the second smooth overdriving table corresponding to the second transitional region;

the driving unit being further used for driving the second transitional region according to the second smooth overdriving table.

6. The driving apparatus according to claim 5, wherein a third grayscale value of the third partition overdriving table is C, a fourth grayscale value of the fourth partition overdriving table is D, positions of the first grayscale value, the second grayscale value, the third grayscale value and the fourth grayscale value in the matrix form being corresponding to one another, C and D being natural numbers, the second forming unit further comprising a second calculation module;

the second calculation module being used for calculating a grayscale value of pixel units of the second transitional region as $$\frac{A+B+C+D}{4},$$

to form the second smooth overdriving table.

7. The driving apparatus according to claim 4, wherein the partitioning unit comprises a counter and a register, the counter being used for counting corresponding data lines and gate lines thereby forming coordinate values of the pixel units, the register being used for storing the coordinate values.

8. The driving apparatus according to claim 4, wherein the first forming unit comprises a first accumulator and a first memory, the first accumulator being used for manually debugging all combinations of grayscale values of a current frame and grayscale values of a previous frame, storing desired overdriving grayscale values in the first memory.

9. The driving apparatus according to claim 4, wherein the driving unit comprises a source driver.

10. A display device comprising a driving apparatus, the driving apparatus comprising a partitioning unit, a first forming unit, a second forming unit and a driving unit;

the partitioning unit being used for partitioning a display area into a plurality of rectangular partitions, a first transitional region formed between a first partition and a second partition which are adjacent to each other;

the first forming unit being used for forming a first partition overdriving table and a second partition overdriving table, the first partition overdriving table corresponding to the first partition, the second partition overdriving table corresponding to the second partition, the first partition overdriving table and the second partition overdriving table having the same matrix form;

the second forming unit being used for performing operational processing on the first partition overdriving table and the second partition overdriving table according to a first smooth algorithm to form a first smooth overdriving table, the first smooth overdriving table corresponding to the first transitional region;

the driving unit being used for driving the first transitional region according to the first smooth overdriving table, wherein a first grayscale value of the first partition overdriving table is A, a second grayscale value of the second partition overdriving table is B, a position of the first grayscale value in the matrix form corresponding to that of the second grayscale value therein, A and B being natural numbers, the second forming unit comprising a definition module, a first calculation module and an accumulation module;

the definition module being used for defining a direction from the first partition to the second partition as a first direction;

the first calculation module being used for calculating the number of pixel units of the first transitional region in the first direction as n, wherein n is a natural number;

the accumulation module being used for, starting from the first grayscale value A, calculating a grayscale value of an m-th pixel unit located within the first transitional region along the first direction as $$A+\frac{B-A}{n+1}*m,$$

wherein n is the number of pixel units, m is a natural number, to form the first smooth overdriving table, wherein the second forming unit comprises a second accumulator and a second memory, the second accumulator being used for performing accumulation with $$\frac{B-A}{n+1}$$

from an initial overdriving grayscale value successively, thereby obtaining corresponding overdriving grayscale values, and storing the overdriving grayscale values in the second memory.

11. The display device according to claim 10, wherein the rectangular partitions further include a third partition and a fourth partition, the first partition being arranged adjacent to the second partition and the fourth partition, respectively, the third partition being arranged adjacent to the second partition and the fourth partition, respectively, the first partition, the second partition, the third partition and the fourth partition together defining a second transitional region;

the first forming unit being further used for forming a third partition overdriving table and a fourth partition overdriving table, the third partition overdriving table corresponding to the third partition, the fourth partition overdriving table corresponding to the fourth partition, the first partition overdriving table, the second partition overdriving table, the third partition overdriving table and the fourth partition overdriving table having the same matrix form;

the second forming unit being further used for performing operational processing on the first partition overdriving table, the second partition overdriving table, the third partition overdriving table and the fourth partition overdriving table according to a second smooth algorithm to form a second smooth overdriving table, the second smooth overdriving table corresponding to the second transitional region;

the driving unit being further used for driving the second transitional region according to the second smooth overdriving table.

12. The display device according to claim 11, wherein a third grayscale value of the third partition overdriving table is C, a fourth grayscale value of the fourth partition overdriving table is D, positions of the first grayscale value, the second grayscale value, the third grayscale value and the fourth grayscale value in the matrix form being corresponding to one another, C and D being natural numbers, the second forming unit further comprising a second calculation module;

the second calculation module being used for calculating a grayscale value of pixel units of the second transitional region as $$\frac{A+B+C+D}{4},$$

to form the second smooth overdriving table.

13. The display device according to claim 10, wherein the partitioning unit comprises a counter and a register, the counter being used for counting corresponding data lines and gate lines thereby forming coordinate values of the pixel units, the register being used for storing the coordinate values.

14. The display device according to claim 10, wherein the first forming unit comprises a first accumulator and a first memory, the first accumulator being used for manually debugging all combinations of grayscale values of a current frame and grayscale values of a previous frame, storing desired overdriving grayscale values in the first memory.

15. The display device according to claim 10, wherein the driving unit comprises a source driver.

* * * * *